US010169302B2

(12) United States Patent
Deng et al.

(10) Patent No.: US 10,169,302 B2
(45) Date of Patent: Jan. 1, 2019

(54) METHOD AND SYSTEM FOR PAGE DISPLAY, SERVER-END DEVICE, CLIENT DEVICE AND STORAGE MEDIUM

(71) Applicant: TENCENT TECHNOLOGY (SHENZHEN) COMPANY LIMITED, Guangdong (CN)

(72) Inventors: Jiaowu Deng, Guangdong (CN); Kaipeng Xu, Guangdong (CN); Yaohua Tan, Guangdong (CN); Wubo Cao, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 596 days.

(21) Appl. No.: 14/564,175

(22) Filed: Dec. 9, 2014

(65) Prior Publication Data
US 2015/0095764 A1 Apr. 2, 2015

Related U.S. Application Data

(63) Continuation of application No. PCT/CN2013/076821, filed on Jun. 5, 2013.

(30) Foreign Application Priority Data

Jun. 14, 2012 (CN) .......................... 2012 1 0196667

(51) Int. Cl.
G06F 17/00 (2006.01)
G06F 17/21 (2006.01)
(Continued)

(52) U.S. Cl.
CPC ........ G06F 17/212 (2013.01); G06F 17/2247 (2013.01); G06F 17/30899 (2013.01); H04L 67/02 (2013.01); H04L 67/1095 (2013.01)

(58) Field of Classification Search
CPC .................................................. G06F 17/3089
See application file for complete search history.

(56) References Cited

U.S. PATENT DOCUMENTS 6,061,738 A * 5/2000 Osaku ............... G06F 17/30241
709/245
8,751,681 B1 * 6/2014 Pendakur ............... H04N 7/163
709/236
(Continued)

FOREIGN PATENT DOCUMENTS

CN 101296255 10/2008
CN 101620635 1/2010
(Continued)

OTHER PUBLICATIONS

International Search Report, PCT/CN2013/076821, Tencent Technology Shenzhen Company Limited, dated Sep. 19, 2013.
(Continued)

Primary Examiner — Andrew T McIntosh
(74) Attorney, Agent, or Firm — Anova Law Group, PLLC

(57) ABSTRACT

Disclosed are a method and system for page display, a service-end device, a client device and a storage medium. The method provided in the present invention includes: acquiring a first page content corresponding to a page to be displayed by a client device; distributing page identification information for the first page content; according to the first page content and the page identification information distributed to the first page content, generating first page presentation information, and storing the first page presentation information in a service-end device; and generating page invocation information according to the page identification information, the page invocation information comprising the page identification information and being used for invoking the first page presentation information. The present inven- (Continued)

tion can realize synchronous update of the page contents of a service-end device and a client device, increasing the update efficiency of the page contents.

14 Claims, 6 Drawing Sheets

(51) Int. Cl.
*H04L 29/08* (2006.01)
*G06F 17/30* (2006.01)
*G06F 17/22* (2006.01)

(56) References Cited

U.S. PATENT DOCUMENTS

| | | |
|---|---|---|
| 2002/0143813 A1 | 10/2002 | Jellum et al. |
| 2007/0271385 A1* | 11/2007 | Davis .................... G06F 11/203 709/228 |
| 2008/0163193 A1* | 7/2008 | Hayton ................ G06Q 20/382 717/173 |
| 2013/0318148 A1* | 11/2013 | Atamel ............... G06F 17/3089 709/203 |

FOREIGN PATENT DOCUMENTS

| | | |
|---|---|---|
| CN | 102137126 | 7/2011 |
| WO | WO02/077869 | 10/2002 |

OTHER PUBLICATIONS

Patent Abstract of CN101296255, Web Page Browsing Method, System, Proxy Server and Mobile Phone Browser, Tencent Tech Shenzhen Co. Ltd. (CN), Oct. 29, 2008.
Patent Abstract of CN101620635, Page Data Obtaining Method and Server, Page Updating Method and Server, Zte Corp., Jan. 6, 2010.
Patent Abstract of CN102137126, System and Method for Updating Web Data, Tencent Tech Shenzhen Co. Ltd., Jul. 27, 2011.
The State Intellectual Property Office of the People's Republic of China (SIPO) Office Action 1 for 201210196667.4 dated Nov. 4, 2015 8 Pages (including translation).

\* cited by examiner

US 10,169,302 B2

METHOD AND SYSTEM FOR PAGE DISPLAY, SERVER-END DEVICE, CLIENT DEVICE AND STORAGE MEDIUM

The present application is a continuation of International Application No. PCT/CN2013/076821 filed on Jun. 5, 2013 and entitled "Method and System for Page Display, Server-end Device, Client Device and Storage Medium", which claims priority to a Chinese patent application No. 201210196667.4 filed on Jun. 14, 2012 in the name of Tencent Technology (Shenzhen) Co. Ltd., entitled "Method and System for Page Display, Server-end Device and Client Device", disclosures of which are incorporated herein by reference in their entireties.

TECHNICAL FIELD

The present disclosure relates to the field of Internet technologies, and in particular to a method and system for page display, a server-end device, a client device, and a storage medium.

TECHNICAL BACKGROUND

Presently, to display a page on network devices in a network, page information corresponding to the page for displaying is configured for each of the network devices, so that the network device can display the page according to the corresponding page information. In displaying the page as above, the inventors found the prior art is defective at least in that: if a page is updated in a server-end device, the network device displaying the page cannot timely update page contents of the displayed page, instead, the server-end device is required to regenerate page codes for each of the network device and then the network device is independently updated with the regenerated page codes to display the updated page, resulting a low efficiency of updating the page contents.

SUMMARY OF THE INVENTION

Embodiments of the present invention provide a method and system for page display, a server-end device, a client device and a storage medium, to achieve the synchronous update of the page content at the server-end device and the client device, and improve the efficiency of updating the page content.

To achieve the above objects, the embodiments of the present invention provide the following technical solutions.

A method for page display, which is operable in a server-end device, includes:
  obtaining a first page content corresponding to a page to be displayed at a client device;
  allocating page identity information to the first page content, where the page identity information has a one-to-one correspondence relationship with the first page content;
  generating first page representation information from the first page content and the page identity information allocated to the first page content, and storing the generated first page representation information in the server-end device, where the first page representation information may include the first page content, the page identity information allocated to the first page content, and a correspondence relationship between the first page content and the page identity information allocated to the first page content; and
  generating page invoking information from the page identity information, where the page invoking information contains the page identity information and is used to invoke the first page representation information.

A method for page display, which is operable in a client device and includes:
  obtaining page invoking information, wherein the page invoking information contains page identity information used for identifying a page content at a server-end device, and the page identity information has a one-to-one correspondence relationship with the page content identified by the page identity information at the server-end device;
  obtaining a page content corresponding to the page identity information from the server-end device according to the page invoking information; and
  generating a page for displaying from the page content corresponding to the page identity information, and displaying the page.

A server-end device includes:
  a first obtaining unit configured to obtain a first page content corresponding to a page to be displayed at a client device;
  an allocating unit configured to allocate page identity information to the first page content obtained by the first obtaining unit, wherein the page identity information has a one-to-one correspondence relationship with the first page content, where the first page representation information includes the first page content, the page identity information allocated to the first page content, and a correspondence relationship between the first page content and the page identity information allocated to the first page content;
  a first generating unit configured to generate first page representation information from the first page content obtained by the first obtaining unit and the page identity information allocated to the first page content by the allocating unit;
  a first storage unit configured to store the first page representation information generated by the first generating unit in the server-end device; and
  a second generating unit configured to generate page invoking information from the page identity information, wherein the page invoking information includes the page identity information and is used to invoke the first page representation information.

A client device includes:
  a first obtaining unit configured to obtain page invoking information, wherein the page invoking information contains page identity information used for identifying a page content at a server-end device, and the page identity information has a one-to-one correspondence relationship with the page content identified by the page identity information at the server-end device;
  a second obtaining unit configured to obtain a page content corresponding to the page identity information from the server-end device according to the page invoking information obtained by the first obtaining unit;
  a generating unit configured to generate a page for displaying from the page content corresponding to the page identity information obtained by the second obtaining unit; and
  a display unit configured to display the page for displaying generated by the generating unit.

A system for page display includes a server-end device and a client device, where, the server-end device is configured to: obtain a page content corresponding to a page to be displayed at the client device; allocate page identity information to the page content, wherein the page identity information has a one-to-one correspondence relationship with the page content; generate page representation information from the page content and the page identity information allocated to the page content, and store the page representation information in the server-end device, where the page representation information includes the page content, the page identity information allocated to the page content, and a correspondence relationship between the page content and the page identity information allocated to the page content; and generate page invoking information from the page identity information, wherein the page invoking information comprises the page identity information and is used to invoke the page representation information; and the client device is configured to: obtain page invoking information; obtain a page content corresponding to the page identity information from the server-end device according to the page invoking information; and generate a page for displaying from the page content corresponding to the page identity information, and display the page for displaying.

One or more storage media contain computer executable instructions, where the computer-executable instructions are configured to perform a method for page display including steps of:

obtaining a page content corresponding to a page to be displayed at a client device;

allocating page identity information to the page content, wherein the page identity information has a one-to-one correspondence relationship with the page content;

generating page representation information from the page content and the page identity information allocated to the page content, and storing the page representation information in a server-end device; and generating page invoking information from the page identity information, wherein the page invoking information includes the page identity information and is used to invoke the page representation information.

One or more storage media include computer-executable instructions, where the computer-executable instructions are configured to perform a method for page display including steps of:

obtaining page invoking information which contains page identity information used for identifying the page content at a server-end device, wherein the page identity information has a one-to-one correspondence relationship with the page content identified by the page identity information at the server-end device;

obtaining a page content corresponding to the page identity information from the server-end device according to the page invoking information; and generating a page for displaying from the page content corresponding to the page identity information, and displaying the page for displaying.

With the method and system for page display, the server-end device, the client device and the storage medium provided in the embodiments of the present invention, the server-end device allocates unique identity information to the page content corresponding to a page for displaying at the client device, and generates the page representation information and the page invoking information used for invoking the page representation information according to the page content and the unique identity information corresponding to the page content, so that the client device is allowed to obtain the page content from the server-end device according to the page invoking information to generate the page for displaying from the obtained page content. Thus, to update the page content at the client device, merely the corresponding page content at the server-end device is required to be updated, thereby avoiding manual update of page information at the network device of each client, implementing the synchronous update of the page content at both the server-end device and the client device, and improving the efficiency of updating the page content.

DESCRIPTION OF DRAWINGS

Accompanying drawings used for the description of embodiments of the present invention or the prior art are briefly introduced below in order to illustrate the technical solutions in the embodiments of the present invention or the prior art more clearly. Apparently, the drawings for the following description illustrate merely some embodiments of the present invention, and other drawings can be derived from the described drawings by those skilled in the art without any creative work.

DETAILED DESCRIPTION OF THE EMBODIMENTS

Technical solutions provided in embodiments of the present invention are described below in conjunction with the accompanying drawings. Apparently, the embodiments described herein, which form merely a part but not all of the embodiments of the invention, are intended to illustrate the principles of the present disclosure, but not to limit the present disclosure to the particular embodiments. All other embodiments obtained by those skilled in the art in light of the described embodiments of the invention without any creative work fall within the protection scope of the present disclosure.

First Embodiment

Figure 1:
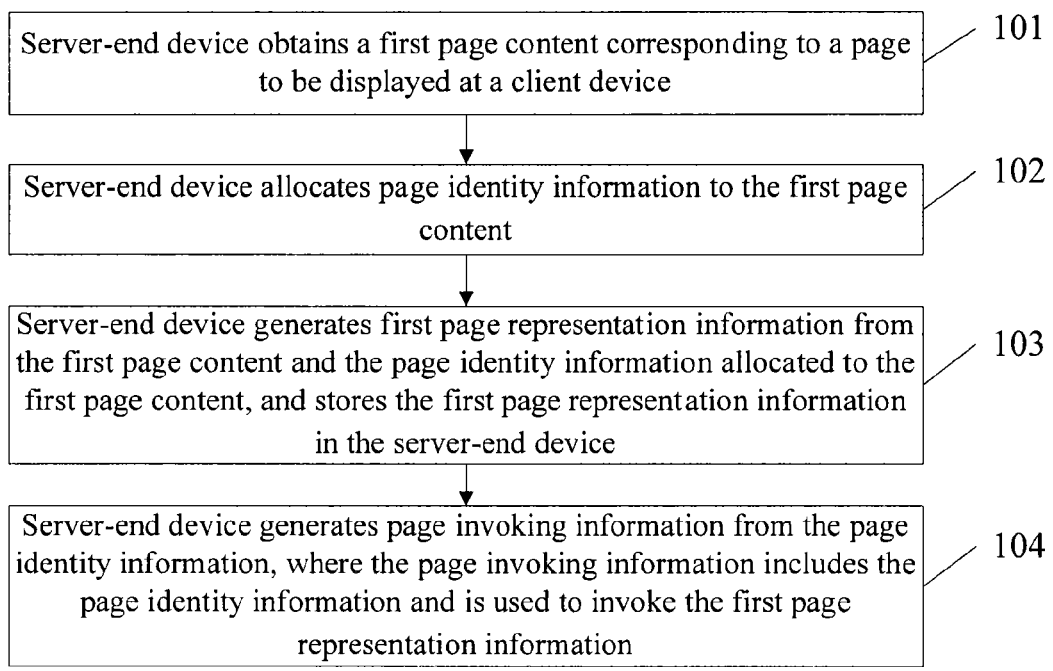
FIG. 1 is a flowchart showing a method for page display according to a first embodiment of the present invention.

An embodiment of the present invention provides a method for page display. As shown in FIG. 1, the method is applicable to a server-end device and includes Steps 101, 102, 103, and 104 below.

At Step 101, the server-end device obtains a first page content corresponding to a page to be displayed at a client device.

The first page content includes parameters representing a display feature of the page to be displayed such as a background color and a size of the page, or a content of the page per se such as an image and a document, which will not be listed herein in the embodiment in an exhaust manner.

The server-end device may obtain the first page content corresponding to the page to be displayed at the client device by directly reading the first page content from a database, or by receiving the first page content that is manually inputted, which is not limited in the embodiment.

At Step 102, the server-end device allocates page identity information to the first page content.

The page identity information has a one-to-one correspondence relationship with the first page content. For example, in an electronic transaction platform for virtual goods, the page identity information is a visual business to customer tag (vb2ctag) which may be represented by 1_1_1_1_1, of which one or more of 5 digits may be modified to obtain different page identity information.

Herein, the server-end device may allocate the page identity information to the first page content in such a way of:

obtaining a page identity information category corresponding to the first page content, according to the first page content;

obtaining page identity information from the page identity information category corresponding to the first page content; and selecting page identity information among unallocated page identity information from the page identity information category corresponding to the first page content, and allocating the selected page identity information to the first page content.

The page identity information categories may be divided as per page contents. For example, the page identity information categories are divided as per functions and usages of pages for displaying that correspond to the page contents, or divided as per particular information contained in the page contents such as size ranges, colors and background brightness of the pages, but the present embodiment is not limited thereto.

Herein, selecting page identity information among unallocated page identity information from the page identity information category corresponding to the first page content and allocating the selected page identity information to the first page content may be implemented in such a way of: obtaining a current value of vb2ctag from the page identity information category corresponding to the first page content if vb2ctag is employed as the page identity information, and increasing the current value of vb2ctag by 1 and allocating the increased current value as the page identity information of the first page content. Of course, the implementation of selecting the page identity information and allocating the selected page identity information to the first page content may be adapted as desired, and hence is not limited thereto.

At Step 103, the server-end device generates first page representation information from the first page content and the page identity information allocated to the first page content, and stores the first page representation information in the server-end device.

The first page representation information may include the first page content, the page identity information allocated to the first page content, and a correspondence relationship between the first page content and the page identity information allocated to the first page content.

The server-end device may generate first page representation information from the first page content and the page identity information allocated to the first page content in such a way of: encapsulating the first page content and the page identity information allocated to the first page content into a data packet as the first page representation information. The data packet may be represented in the form of computer language codes.

At Step 104, the server-end device generates page invoking information from the page identity information, where the page invoking information includes the page identity information and is used to invoke the first page representation information. In this way, after obtaining the page invoking information, the client device can obtain the first page content corresponding to the page identity information from the server-end device according to the page invoking information, generate a page for displaying from the obtained first page content, and display the page for displaying. As such, the client device is allowed to invoke the page representation information which share the same page identity with the page invoking information, according to the page invoking information, and further obtain the first page content corresponding to the page identity information from the invoked page representation information.

The generating of the page invoking information from the page identity information may be implemented in such a way of: carrying the page identity information in computer language codes having an invoking function, where the computer language codes are used to invoke the page content corresponding to this page identity information only, so that the invoking of the page content corresponding to the page identity information may be indirectly implemented by invoking the page representation information.

In the present embodiment, the server-end device allocates unique identity information to the page content corresponding to a page for displaying, and generates the page representation information and the page invoking information used for invoking the page representation information according to the page content and the unique identity information corresponding to the page content, so that the client device is allowed to obtain the page content from the server-end device according to the page invoking information to generate the page for displaying from the obtained page content. Thus, to update the page content at the client device, merely the corresponding page content at the server-end device is required to be updated, thereby avoiding manual update of page information at the network device of each client, implementing the synchronous update of the page content at both the server-end device and the client device, and improving the efficiency of updating the page content.

Figure 2:
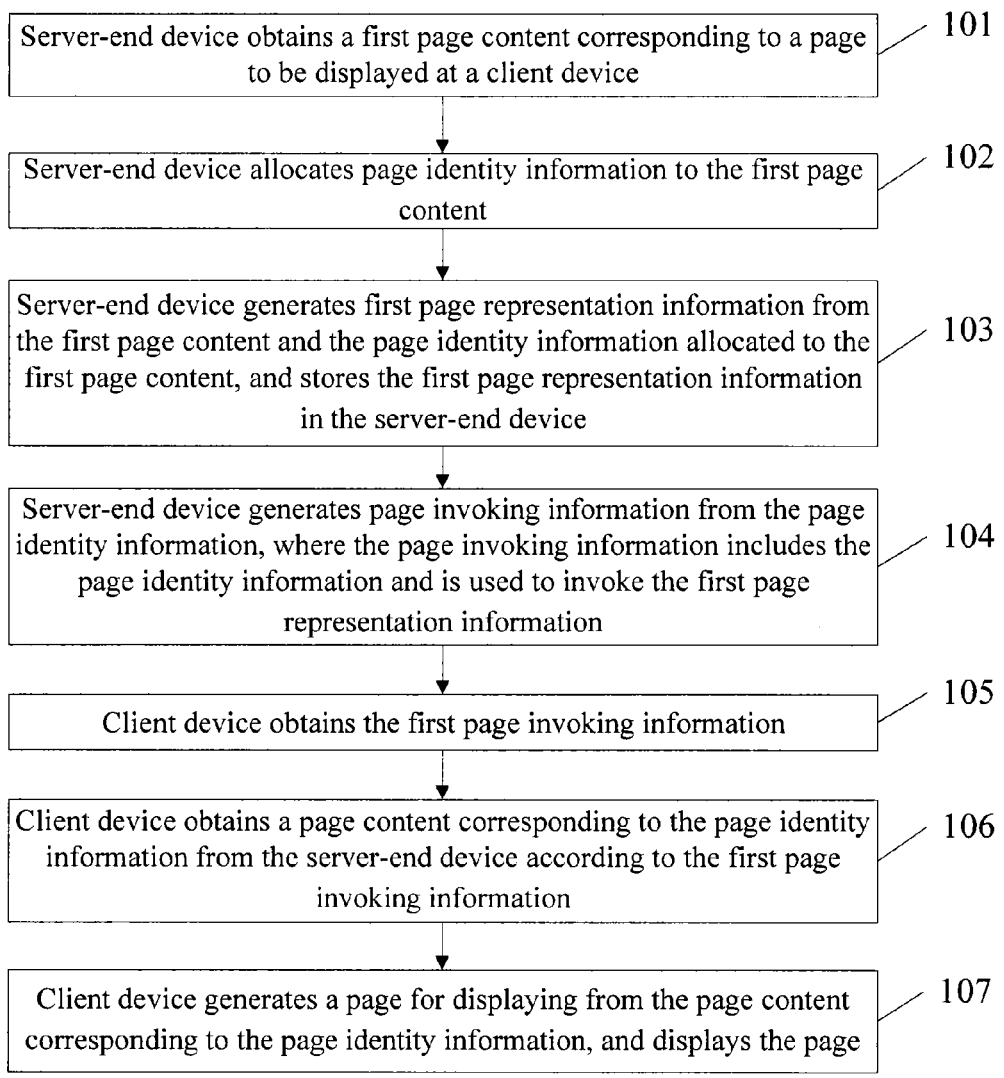
FIG. 2 is a flowchart showing another method for page display according to the first embodiment of the present invention.

To further display the page for displaying in the present embodiment of the invention, as shown in FIG. 2, a method for page display applicable to the client includes Steps 105, 106 and 107 below.

At Step 105, the client device obtains the first page invoking information.

The first page invoking information contains page identity information used for identifying the page content at the server-end device, and the page identity information has a one-to-one correspondence relationship with the page content identified by the page identity information at the server-end device.

Here, obtaining of the first page invoking information by the client device may be implemented through manual configuration, or through a remote synchronization manner, but the present embodiment is not limited thereto.

At Step 106, the client device obtains a page content corresponding to the page identity information from the server-end device according to the first page invoking information.

At Step 107, the client device generates a page for displaying from the page content corresponding to the page identity information, and displays the page.

The obtaining of a page content corresponding to the page identity information from the server-end device according to the first page invoking information may include: invoking page representation information stored in the server-end device according to the first page invoking information, where the page representation information contains at least the page identity information and the page content, so that the client device can obtain the page content from the invoked page representation information to generate the page for displaying, and display the generated page.

As such, in the present embodiment, the client device is allowed to obtain the page content of the page for displaying stored in the server-end device according to the page invoking information, generate the page for displaying from the obtained page content and display the generated page, thereby completing the obtainment and display of the page for displaying.

Figure 3:
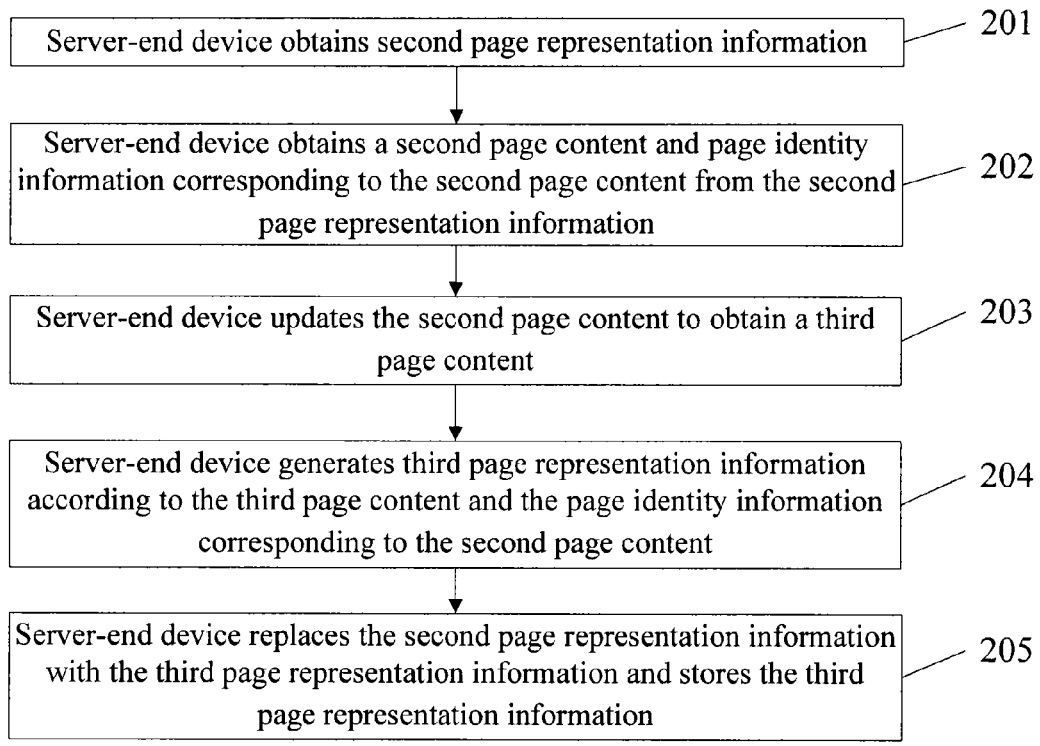
FIG. 3 is a flowchart showing another method for page display according to the first embodiment of the present invention.

In addition, after the page is displayed at the client, the server-end device can modify the page by modifying or replacing the page content corresponding to the page as displayed at the client that is stored at the server-end device. FIG. 3 shows a method of modifying a page for displaying according to an embodiment of the present invention, and the method is applicable to the server-end device and includes Steps 201, 202, 203, 204 and 205 below.

At Step 201, the server-end device obtains second page representation information, which corresponds to a page content of a page to be modified at the server-end device.

Here, the second page representation information has the same form and carries the same type of information as the first page representation information described in Step 103, which will not be described again in the present embodiment.

At Step 202, the server-end device obtains a second page content and page identity information corresponding to the second page content from the second page representation information.

The obtainment of the second page content and the page identity information corresponding to the second page content from the second page representation information by the server-end device is inverse to the generation of the first page representation information at Step 103, that is, if the generation of the first page representation information is implemented by encapsulating the first page content and the page identity information allocated to the first page content, then the obtainment of the second page content and the page identity information corresponding to the second page content is implemented by unencapsulating the second page representation information, but the present disclosure is not limited thereto.

At Step 203, the server-end device updates the second page content to obtain a third page content.

At Step 204, the server-end device generates third page representation information according to the third page content and the page identity information corresponding to the second page content.

The implementation of Step 204 may be the same as that of Step 103, and will not be described again in the present embodiment of the invention herein.

At Step 205, the server-end device replaces the second page representation information with the third page representation information and stores the third page representation information.

In the present embodiment, the page content may be modified at the server-end device without changing the page identity information corresponding to the page content, so that the modified page content may be invoked by the client by using the page invoking information corresponding to the page identity information, thereby avoiding manual update of page information at the network device of each client, improving the efficiency of updating the page content, and reducing the cost for page updating.

In method for page display provided in the present embodiment, the server-end device allocates unique identity information to the page content corresponding to a page for displaying at the client device, and generates the page representation information and the page invoking information used for invoking the page representation information according to the page content and the unique identity information corresponding to the page content, so that the client device is allowed to obtain the page content from the server-end device according to the page invoking information to generate the page for displaying from the obtained page content. Thus, to update the page content at the client device, merely the corresponding page content at the server-end device is required to be updated, thereby avoiding manual update of page information at the network device of each client, implementing the synchronous update of the page content at both the server-end device and the client device, and improving the efficiency of updating the page content.

Second Embodiment

Figure 4:
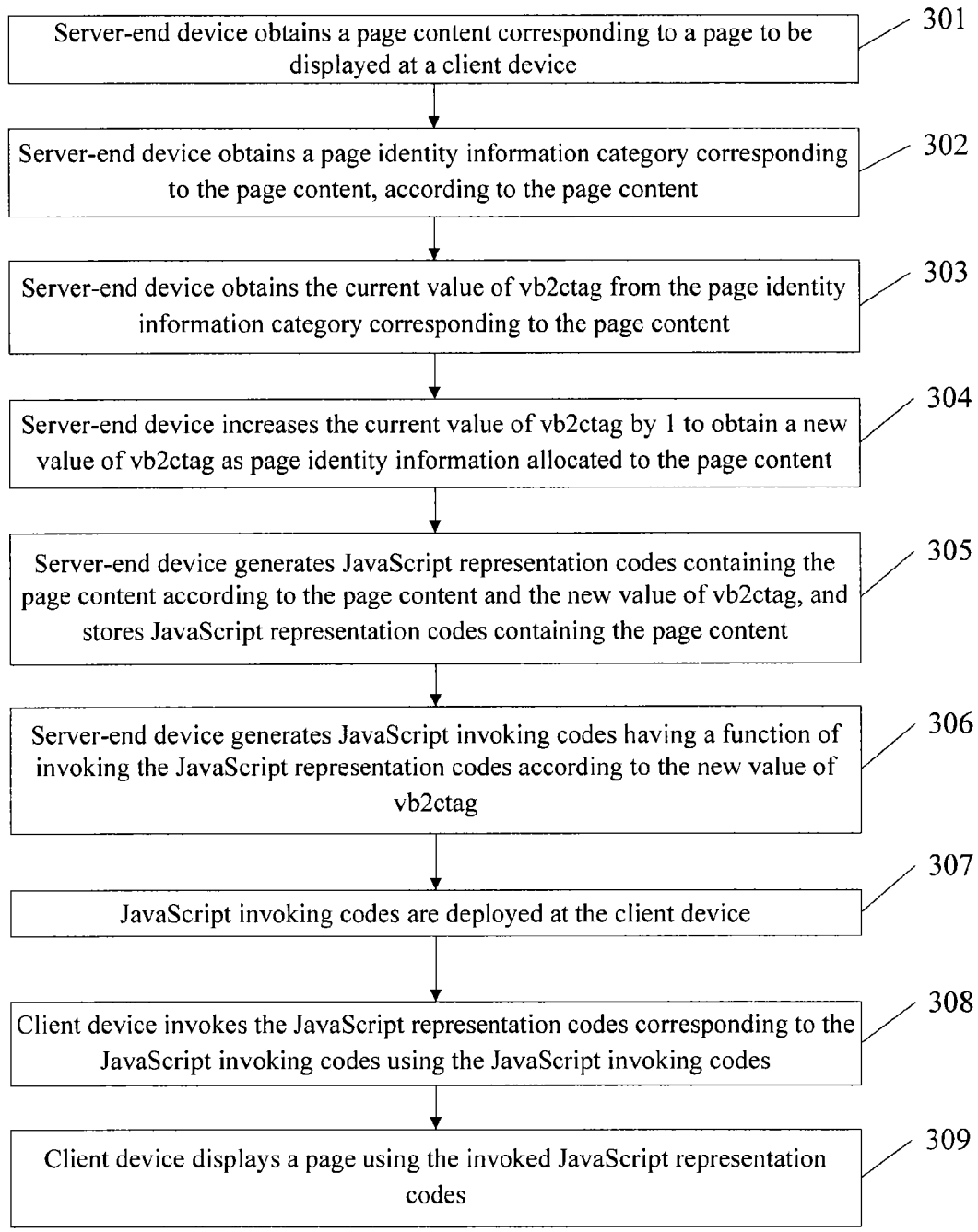
FIG. 4 is a flowchart of displaying a web page based on vb2ctag according to a second embodiment of the present invention.

The present embodiment of the invention provides a method for displaying a web page based on vb2ctag, and the method is applicable to a network architecture in which a server-end device is connected with a plurality of client devices. As shown in FIG. 4, the method includes Steps 301 to 309 below.

At Step 301, the server-end device obtains a page content corresponding to a page to be displayed at a client device.

The page content may include parameters representing a display feature of the page to be displayed such as a background color and a size of the page.

At Step 302, the server-end device obtains a page identity information category corresponding to the page content, according to the page content.

The page identity information category is similar to the page identity information category described with respect to Step 102, and will not be further described in the present embodiment.

At Step 303, the server-end device obtains the current value of vb2ctag from the page identity information category corresponding to the page content.

At Step 304, the server-end device increases the current value of vb2ctag by 1 to obtain a new value of vb2ctag as page identity information allocated to the page content.

Here, vb2ctag is represented by 1_1_1_1_1 formed by five parameters, one or more of which may be summed up to generate the new value of vb2ctag depending on actual situations, which are not limited in the present embodiment.

At Step 305, the server-end device generates JavaScript representation codes containing the page content according to the page content and the new value of vb2ctag, and stores JavaScript representation codes containing the page content.

Here, JavaScript refers to a computer script language.

At Step 306, the server-end device generates JavaScript invoking codes having a function of invoking the JavaScript representation codes according to the new value of vb2ctag.

With the value of vb2ctag carried in the JavaScript invoking codes, the JavaScript invoking codes may be used for invoking the JavaScript representation codes carrying the same value of vb2ctag.

At Step 307, the JavaScript invoking codes are deployed at the client device.

At Step 308, the client device invokes the JavaScript representation codes corresponding to the JavaScript invoking codes using the JavaScript invoking codes.

At Step 309, the client device displays a page using the invoked JavaScript representation codes.

It is noted that, after the JavaScript invoking codes are deployed at the client device, the client device can invoke the corresponding JavaScript representation codes using the JavaScript invoking codes, as long as the client device is in normal communication with the server-end device.

It is further noted that, when the server-end device updates a page to be displayed, the page content contained in the JavaScript representation codes is modified, but the value of vb2ctag remains unchanged, so that the client device can still invoke the modified JavaScript representation codes using the JavaScript invoking codes containing the original value of vb2ctag, without modifying any parameter at the client device.

In the method of displaying a web page based on vb2ctag according to the present embodiment, the server-end device allocates unique vb2ctag to the page content corresponding to a page for displaying at the client device, and generates the JavaScript representation codes having a page representation function and the JavaScript invoking codes used for invoking the JavaScript representation codes according to the page content and the unique vb2ctag corresponding to the page content, so that the client device is allowed to obtain the JavaScript representation codes from the server-end device by using the JavaScript invoking codes to represent the page for display. Thus, to update the page content at the client device, merely the corresponding page content at the server-end device is required to be updated, thereby avoiding manual update of page information at the network device of each client, implementing the synchronous update of the page content at both the server-end device and the client device, and improving the efficiency of updating the page content.

Third Embodiment

Figure 5:
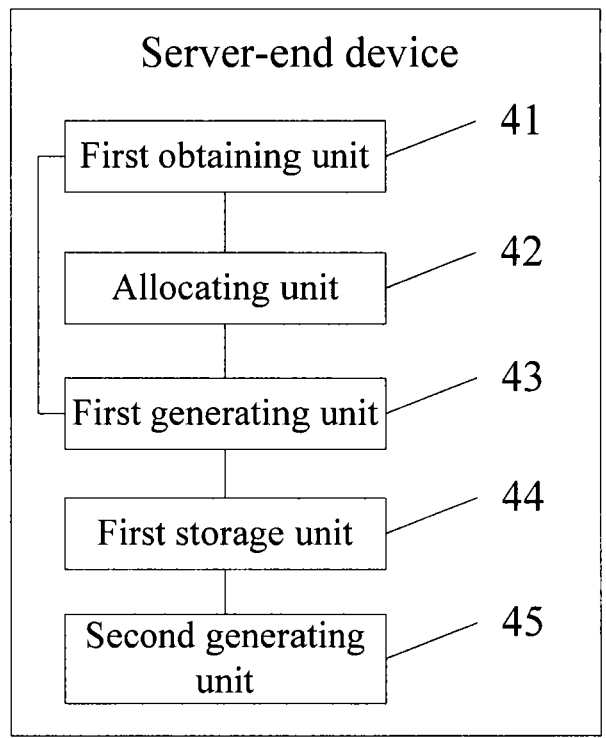
FIG. 5 is a block diagram showing a structure of a server-end device according to a third embodiment of the present invention.

The present embodiment of the invention provides a server-end device configured to embody the method for page display provided by the present disclosure. As shown in FIG. 5, the server-end device includes a first obtaining unit 41, an allocating unit 42, a first generating unit 43, a first storage unit 44, and a second generating unit 45.

The first obtaining unit 41 is configured to obtain a first page content corresponding to a page to be displayed at a client device.

The allocating unit 42 is configured to allocate page identity information to the first page content obtained by the first obtaining unit 41. The page identity information has a one-to-one correspondence relationship with the first page content.

The first generating unit 43 is configured to generate first page representation information from the first page content obtained by the first obtaining unit 41 and the page identity information allocated to the first page content by the allocating unit 42. In an implementation, the first page representation information includes the first page content, the page identity information allocated to the first page content, and a correspondence relationship between the first page content and the page identity information allocated to the first page content.

The first storage unit 44 is configured to store the first page representation information generated by the first generating unit 43 in the server-end device.

The second generating unit 45 is configured to generate page invoking information from the page identity information, where the page invoking information includes the page identity information and is used to invoke the first page representation information.

Figure 6:
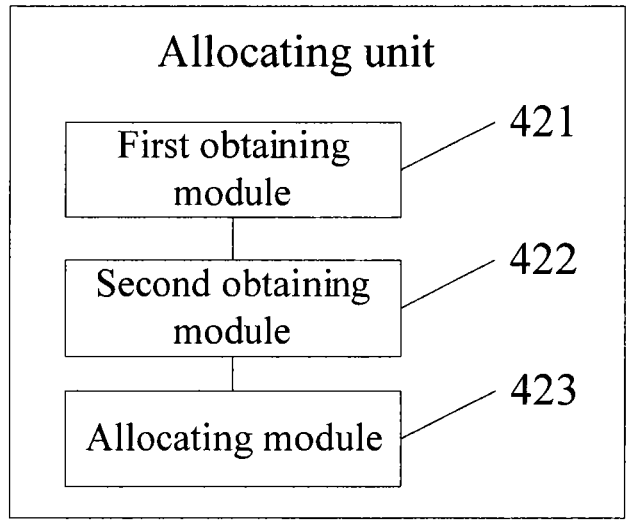
FIG. 6 is a block diagram showing another structure of a server-end device according to the third embodiment of the present invention.

Optionally, as shown in FIG. 6, the allocating unit 42 includes a first obtaining module 421, a second obtaining module 422, and an allocating module 423.

The first obtaining module 421 is configured to obtain a page identity information category corresponding to the first page content, according to the first page content.

The second obtaining module 422 is configured to obtain page identity information from the page identity information category corresponding to the first page content that is obtained by the first obtaining module 421.

The allocating module 423 is configured to select page identity information among unallocated page identity information that is from the page identity information category corresponding to the first page content and obtained by the second obtaining module 422, and allocate the selected page identity information to the first page content.

Figure 7:
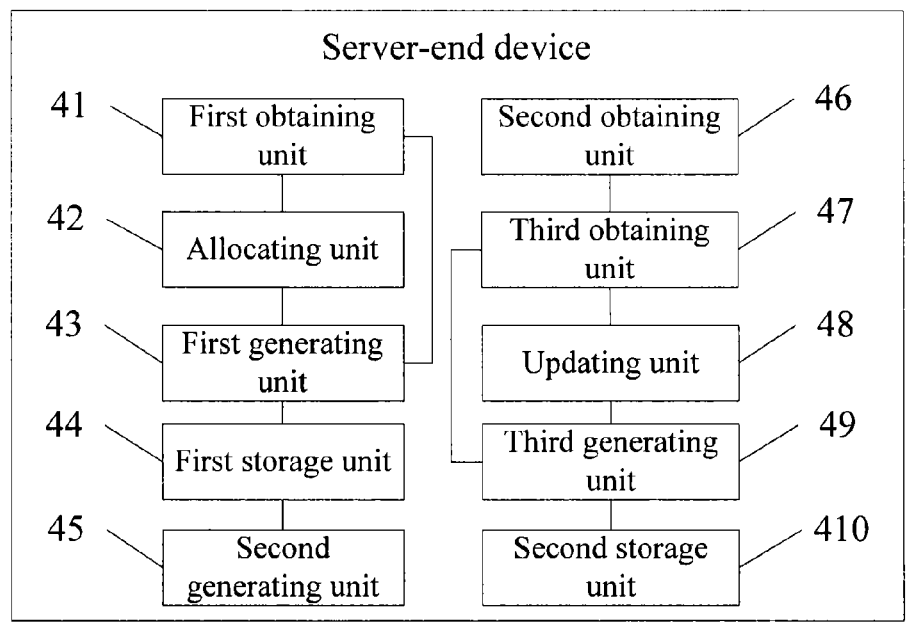
FIG. 7 is a block diagram showing another structure of a server-end device according to the third embodiment of the present invention.

Optionally, as shown in FIG. 7, the server-end device further includes: a second obtaining unit 46, a third obtaining unit 47, an updating unit 48, a third generating unit 49, and a second storage unit 410.

The second obtaining unit 46 is configured to obtain second page representation information.

The third obtaining unit 47 is configured to obtain a second page content and page identity information corresponding to the second page content from the second page representation information obtained by the second obtaining unit 46.

The updating unit 48 is configured to update the second page content obtained by the third obtaining unit 47 to obtain a third page content.

The third generating unit 49 is configured to generate third page representation information according to the third page content generated by the updating unit 48 and the page identity information corresponding to the second page content obtained by the third obtaining unit 47.

The a second storage unit 410 is configured to replace the second page representation information with the third page representation information generated by the third generating unit 49 and stores the third page representation information.

Figure 8:
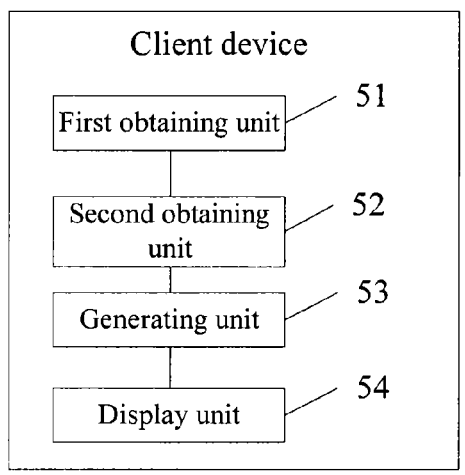
FIG. 8 is a block diagram showing a structure of a client device according to the third embodiment of the present invention.

An embodiment of the present invention further provides a client device which embodies the method for page display provided in the present disclosure. As shown in FIG. 8, the client device includes a first obtaining unit 51, a second obtaining unit 52, a generating unit 53, and a display unit 54.

The first obtaining unit 51 is configured to obtain page invoking information. The page invoking information contains page identity information used for identifying the page content at the server-end device, and the page identity information has a one-to-one correspondence relationship with the page content identified by the page identity information at the server-end device.

The second obtaining unit 52 is configured to obtain a page content corresponding to the page identity information from the server-end device according to the page invoking information obtained by the first obtaining unit 51.

The generating unit 53 is configured to generate a page for displaying from the page content corresponding to the page identity information obtained by the second obtaining unit 52.

The display unit 54 is configured to display the page for displaying generated by the generating unit 535.

The obtaining, by the second obtaining unit, a page content corresponding to the page identity information from the server-end device according to the page invoking information obtained by the first obtaining unit may include: invoking page representation information stored in the server-end device according to the page invoking information, where the page representation information contains at least the page identity information and the page content.

Figure 9:
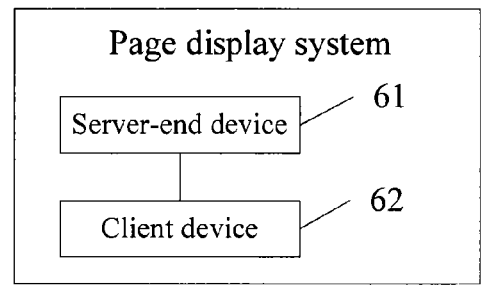
FIG. 9 is a block diagram showing a structure of a system for page display according to the third embodiment of the present invention.

An embodiment of the present invention further provides a system for page display, and as shown in FIG. 9, the system includes a server-end device 61 and a client device 62.

The server-end device 61 is configured to: obtain a page content corresponding to a page to be displayed at the client device; allocate page identity information to the page content, where the page identity information has a one-to-one correspondence relationship with the page content; generate page representation information from the page content and the page identity information allocated to the page content, and store the page representation information in the server-end device, where the page representation information optionally includes the page content, the page identity information allocated to the page content, and a correspondence relationship between the page content and the page identity information allocated to the page content; and generate page invoking information from the page identity information, where the page invoking information includes the page identity information and is used to invoke the page representation information.

The client device 62 is configured to: obtain page invoking information; obtain a page content corresponding to the page identity information from the server-end device according to the page invoking information; and generate a page for displaying from the page content corresponding to the page identity information, and display the page for displaying.

The obtaining, by the client device, of a page content corresponding to the page identity information from the server-end device according to the page invoking information may include that: the client device invokes page representation information stored in the server-end device according to the page invoking information, where the page representation information contains at least the page identity information and the page content.

In the server-end device, client device and system for page display provided in the present embodiment of the invention, the server-end device allocates unique identity information to the page content corresponding to a page for displaying at the client device, and generates the page representation information and the page invoking information used for invoking the page representation information according to the page content and the unique identity information corresponding to the page content, so that the client device is allowed to obtain the page content from the server-end device according to the page invoking information to generate the page for displaying from the obtained page content. Thus, to update the page content at the client device, merely the corresponding page content at the server-end device is required to be updated, thereby avoiding manual update of page information at the network device of each client, implementing the synchronous update of the page content at both the server-end device and the client device, and improving the efficiency of updating the page content.

An embodiment of the present invention further provides one or more storage media containing computer-executable instructions, where the computer-executable instructions are configured to perform a method for page display including steps of:

obtaining a page content corresponding to a page to be displayed at the client device; allocating page identity information to the page content, where the page identity information has a one-to-one correspondence relationship with the page content; generating page representation information from the page content and the page identity information allocated to the page content, and storing the page representation information in the server-end device; and generating page invoking information from the page identity information, where the page invoking information includes the page identity information and is used to invoke the page representation information.

An embodiment of the present invention further provides one or more storage media containing computer-executable instructions, where the computer-executable instructions are configured to perform a method for page display including steps of:

obtaining page invoking information which contains page identity information used for identifying the page content at the server-end device, where the page identity information has a one-to-one correspondence relationship with the page content identified by the page identity information at the server-end device; obtaining a page content corresponding to the page identity information from the server-end device according to the page invoking information; and generating a page for displaying from the page content corresponding to the page identity information, and displaying the page for displaying.

The obtaining of a page content corresponding to the page identity information from the server-end device according to the page invoking information may include: invoking the page representation information stored in the server-end device according to the page invoking information, where the page representation information contains at least the page identity information and the page content.

In light of the description on the above embodiments, it should be clearly understood by the skilled person in the art that the present invention can be embodied by software and the necessary universal hardware, or merely by hardware, but mostly the former is preferable. Based on this understanding, the technical solution of the present invention may be substantially embodied in a software product or a part of the technical solution that contributes to the prior art may be embodied in a software product, and the computer software can be stored in a storage medium which may be a floppy disk, a Read-only Memory (ROM), a Random Access Memory (RAM), a Flash, a hard disk, a Compact Disk (CD) and the like, instructions included in the software product are configured to cause the computer device (such as a personal computer, a server or a network device) to execute the method described in the embodiments of the present invention.

Specific embodiments of the present invention have been described as above, but the present invention is not limited thereto. Any modification or substitution readily occurs to those skilled in the art within the disclosed technical scope of the invention should fall into the scope of protection of the present invention, thus the scope of the invention should be defined by the appended claims.

The invention claimed is:

1. A method for page display, wherein the method is operable in a server-end device and comprises:
    obtaining a first page content corresponding to a page to be displayed at a client device;
    allocating a page identity information to the first page content, wherein the page identity information has a one-to-one correspondence relationship with the first page content, comprising:
        obtaining a page identity information category corresponding to the first page content, the page identity information category is divided as size ranges, colors and background brightness of the page;
        obtaining a current value of a visual business to customer tag (vb2ctag) corresponding to the first page content based on the page identity information category, wherein the vb2ctag is a 5-digit number representing different page identity information; and
        increasing the current value of the vb2ctag by one as the page identity information of the first page content;
    generating a first page representation information from the first page content and the page identity information allocated to the first page content, and storing the generated first page representation information in the server-end device;
    generating page invoking information from the page identity information, wherein the page invoking information contains the page identity information and is used to invoke the first page representation information;
    obtaining a second page representation information; and
    obtaining a second page content and the page identity information corresponding to the second page content from the second page representation information,
        wherein a process of obtaining the second page content and the page identity information from the second page representation information is inverse to a process of generating the first page representation information from the first page content and the page identity information, and
        the first page content and the second page content correspond to the same page identity information.

2. The method of claim 1, wherein, the first page representation information comprises the first page content, the page identity information allocated to the first page content, and the correspondence relationship between the first page content and the page identity information allocated to the first page content.

3. The method of claim 1, wherein, the allocating the page identity information to the first page content further comprises:
    obtaining the page identity information from the page identity information category corresponding to the first page content; and
    selecting one among a plurality of unallocated page identity information from the page identity information category corresponding to the first page content, and allocating the selected page identity information to the first page content.

4. The method of claim 3, wherein, after the generating page invoking information from the page identity information, the method further comprises:
    updating the second page content to obtain a third page content;
    generating a third page representation information from the third page content and the page identity information corresponding to the second page content; and
    replacing the second page representation information with the third page representation information and storing the third page representation information.

5. The method of claim 2, wherein, the allocating page identity information to the first page content further comprises:
    obtaining the page identity information from the page identity information category corresponding to the first page content; and
    selecting one among a plurality of unallocated page identity information from the page identity information category corresponding to the first page content, and allocating the selected page identity information to the first page content.

6. The method of claim 1, wherein generating the first page representation information from the first page content and the page identity information allocated to the first page content, and storing the generated first page representation information in the server-end device, comprises:
    generating a representation code using a computer script language containing the first page content according to the first page content and the page identity information; and
    storing the representation code containing the first page content.

7. The method of claim 1, wherein generating the first page representation information from the first page content and the page identity information, comprises:
    encapsulating the first page content and the page identity information allocated to the first page content.

8. The method of claim 7, obtaining the second page content and the page identity information from the second page representation information, comprises:
    unencapsulating the second page representation information.

9. The method of claim 1, wherein after generating page invoking information from the page identity information, the method further comprising:
    carrying the page identity information in computer language codes having an invoking function, wherein the computer language codes are used to invoke the first page content corresponding to the page identity information, and the invoking of the first page content corresponding to the page identity information is indirectly implemented by invoking the first page representation information.

10. A server-end device, comprising:
    a memory;
    a processor coupled to the memory;
    a plurality of program units stored in the memory to be executed by the processor, the plurality of program units comprising:

a first obtaining unit configured to obtain a first page content corresponding to a page to be displayed at a client device;

an allocating unit configured to allocate a page identity information to the first page content obtained by the first obtaining unit, wherein the page identity information has a one-to-one correspondence relationship with the first page content, wherein the allocating unit is configured to:

obtain a page identity information category corresponding to the first page content, the page identity information category is divided as size ranges, colors and background brightness of the page;

obtain a current value of a visual business to customer tag (vb2ctag) corresponding to the first page content based on the page identity information category, wherein the vb2ctag is a 5-digit number representing different page identity information; and increase the current value of the vb2ctag by one as the page identity information of the first page content;

a first generating unit configured to generate a first page representation information from the first page content obtained by the first obtaining unit and the page identity information allocated to the first page content by the allocating unit;

a first storage unit configured to store the first page representation information generated by the first generating unit in the server-end device;

a second generating unit configured to generate page invoking information from the page identity information, wherein the page invoking information includes the page identity information and is used to invoke the first page representation information;

a second obtaining unit configured to obtain a second page representation information; and a third obtaining unit configured to obtain a second page content and the page identity information corresponding to the second page content from the second page representation information obtained by the second obtaining unit, wherein a process to obtain the second page content and the page identity information from the second page representation information is inverse to a process to generate the first page representation information from the first page content and the page identity information, and the first page content and the second page content correspond to the same page identity information.

11. The server-end device of claim 10, wherein the first page representation information comprises the first page content, the page identity information allocated to the first page content, and a correspondence relationship between the first page content and the page identity information allocated to the first page content.

12. The server-end device of claim 10, wherein the allocating unit further comprises:

a first obtaining module configured to obtain the page identity information category corresponding to the first page content, according to the first page content;

a second obtaining module configured to obtain the page identity information from the page identity information category corresponding to the first page content that is obtained by the first obtaining module; and an allocating module configured to select one among a plurality of unallocated page identity information that is from the page identity information category corresponding to the first page content and obtained by the second obtaining module, and allocate the selected page identity information to the first page content.

13. The server-end device of claim 12, further comprising:

an updating unit configured to update the second page content obtained by the third obtaining unit to obtain a third page content;

a third generating unit configured to generate a third page representation information according to the third page content generated by the updating unit and the page identity information corresponding to the second page content obtained by the third obtaining unit; and a second storage unit configured to replace the second page representation information with the third page representation information generated by the third generating unit and stores the third page representation information.

14. The server-end device of claim 11, wherein the allocating unit further comprises:

a first obtaining module configured to obtain the page identity information category corresponding to the first page content, according to the first page content;

a second obtaining module configured to obtain the page identity information from the page identity information category corresponding to the first page content that is obtained by the first obtaining module; and an allocating module configured to select one among a plurality of unallocated page identity information that is from the page identity information category corresponding to the first page content and obtained by the second obtaining module, and allocate the selected page identity information to the first page content.

\* \* \* \* \*